E. G. CRANDALL.
Horse Hay-Fork.
No. 98,930.
Patented Jan. 18, 1870.
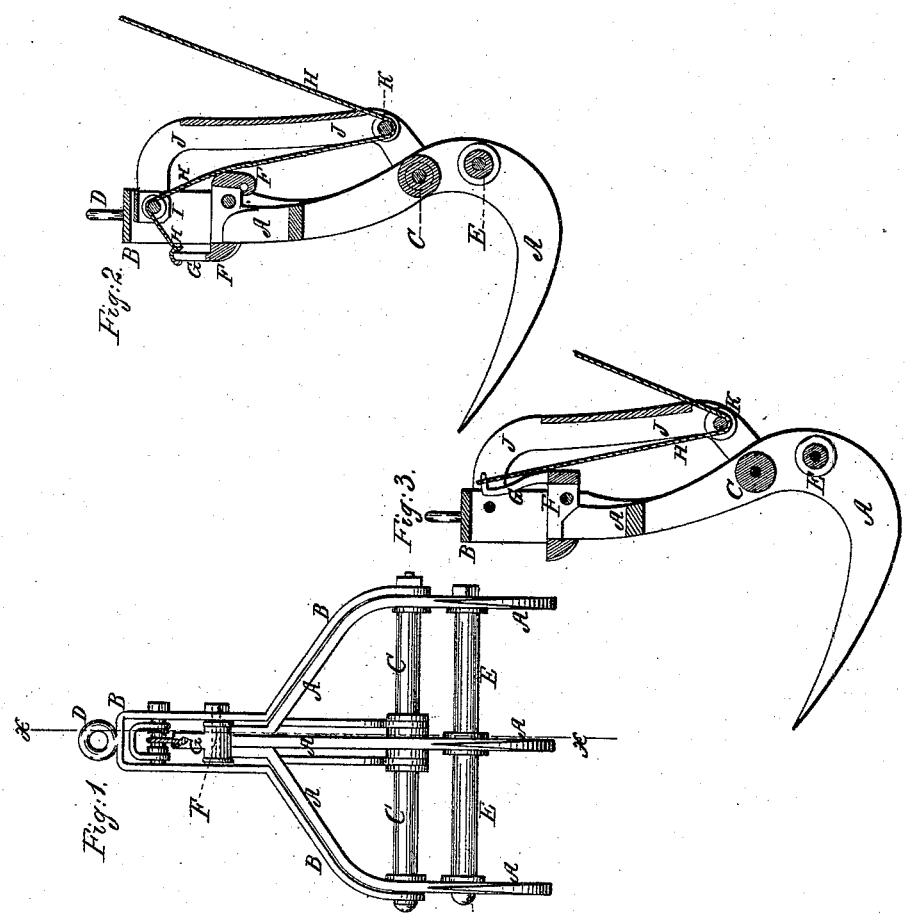

United States Patent Office.

EDWIN G. CRANDALL, OF BELFAST, NEW YORK.

Letters Patent No. 98,930, dated January 18, 1870.

IMPROVED HORSE HAY-FORK.

The Schedule referred to in these Letters Patent and making part of the same.

*To all whom it may concern:*

Be it known that I, EDWIN G. CRANDALL, of Belfast, in the county of Allegany, and State of New York, have invented a new and useful Improvement in Horse Hay-Forks; and I do hereby declare that the following is a full, clear, and exact description thereof, which will enable others skilled in the art to make and use the same, reference being had to the accompanying drawings, forming part of this specification, in which—

Figure 1 is a front view of my improved hay-fork.

Figure 2 is a detail vertical section of the same, taken through the line *x x*, fig. 1.

Figure 3 is the same view as fig. 2, but showing a modification of the latch.

Similar letters of reference indicate corresponding parts.

My invention has for its object to furnish an improved horse hay-fork, simple in construction, strong, and durable, not liable to get out of order, and convenient and reliable in use; and It consists in the construction and combination of the various parts of the fork, as hereinafter more fully described.

A, are the tines, three, more or less, of which may be used. The tines A are curved, as shown in figs. 2 and 3, and their upper ends are brought together, as shown in fig. 1, and bolted or riveted to each other.

B is the yoke, the ends of which are pivoted to the tines A, a little above the main curve of said tines, by a bar or long bolt, C, passing through the ends of the yoke, and through the said tines.

The yoke B is made with a neck, to receive the upper ends of the tines A, as shown in fig. 1, and to its upper end is swivelled or otherwise attached an eye or ring, D, to which the hoisting-rope is attached.

The tines A may be further strengthened by another long bolt, E, passing through the said tines, at or about their main bend, as shown in figs. 1, 2, and 3.

The tines A may be prevented from springing or getting out of place, laterally, by long tubular washers placed upon the bolts C E, or either of them, between the said tines, as shown in the drawings.

F is the latch, which is pivoted to the neck of the yoke B, and may be placed upon the outside or inside of said neck, as may be desired.

The forward end of the latch F, and the rear edge of the upper ends of the tines A, are bevelled off, so that when the upper ends of the tines A are raised into place, they may raise the latch F, and pass under it, and will be securely locked in place by the said latch dropping down over them, as shown in figs. 2 and 3.

Upon the rear end of the latch F is formed a downward projection, against which the ends of the tines A strike, which causes the forward end of the latch F to drop down, thus insuring the locking of the tines, every time the said tines are raised into place.

Upon the forward end of the latch F is formed an arm or lever, G, having an eye formed in its upper end, to receive the trip-rope H.

The trip-rope H passes over the pulley I, pivoted in the upper part of the neck of the yoke B, down along the groove of the guard J, and around the pulley K, pivoted to the lower part of said guard J, as shown in figs. 2 and 3.

If desired, the upwardly-projecting arm or lever G may be attached to or formed upon the rear end of the latch F, as shown fig. 3. In this case, the upper pulley I will not be required.

The guard J is made with a bend at its upper and lower ends, as shown in figs. 1 and 2.

The upper end of the guard J is bolted to the upper part of the neck of the yoke B, and may be slotted, for convenience in adjusting the trip-rope H.

The lower end of the guard J is slotted, for the passage of the trip-rope H, and to receive the middle tine A, and is secured by the bolt C, that pivots the yoke B to the tines A.

The guard J is formed with a groove along its inner side for the passage of the trip-rope H, and is designed to protect said rope and the rear end of the latch F from striking against any object, and dumping the hay, before it has reached the desired position.

The guard J also strengthens and braces the fork.

By this construction, it will be impossible for the trip-rope H to become wound about the fork and hay while the loaded fork is being raised to its place, as the said rope comes out at the lower part of the fork below the greater part of the load, so that it is always in proper position for being operated to dump the hay.

Having thus described my invention,

I claim as new, and desire to secure by Letters Patent—

The horse hay-fork, formed by the combination of the guard J, pulleys I and K, double latch F G, yoke B, tines A, and the pivot or fulcrum-bolt C, and strengthening-bolt E, having tubular washers for holding said tines in place, all constructed and arranged as shown and described.

EDWIN G. CRANDALL.

Witnesses:
 H. RICH,
 M. F. ROBESON.